United States Patent [19]

Warner

[11] Patent Number: 4,625,459

[45] Date of Patent: Dec. 2, 1986

[54] WINDOW PANE FOR MOTOR VEHICLES

[75] Inventor: Hermann Warner, Trebur, Fed. Rep. of Germany

[73] Assignee: General Motors Corporation, Detroit, Mich.

[21] Appl. No.: 718,508

[22] Filed: Apr. 1, 1985

[30] Foreign Application Priority Data

Apr. 6, 1984 [DE] Fed. Rep. of Germany ....... 3413029

[51] Int. Cl.⁴ .............................................. E06B 7/16
[52] U.S. Cl. ...................................... 49/488; 49/489; 52/400
[58] Field of Search .................... 49/488, 489; 52/397, 52/400, 716, 717

[56] References Cited

U.S. PATENT DOCUMENTS

| | | | |
|---|---|---|---|
| 2,405,460 | 8/1946 | Smith | 49/488 |
| 2,655,239 | 10/1953 | Kenlock | 52/400 |
| 3,851,432 | 12/1974 | Griffin | 52/400 |
| 4,358,917 | 11/1982 | Oda et al. | 52/400 |
| 4,483,113 | 11/1984 | Kruschwitz | 52/400 X |

Primary Examiner—Philip C. Kannan
Attorney, Agent, or Firm—William A. Schuetz

[57] ABSTRACT

A window pane for motor vehicles is fastened to the flange of a window frame by means of a retaining member attached to said window pane through cementing, bonding, or the like. The retaining member is also clamped into a recess provided on the window frame by way of a projecting portion formed on a locking member.

To improve retention of the retaining member on the window frame and to add extra stability and rigidity, the retaining member is provided with a recess for a second projecting portion formed on the locking member, and the second projecting member conforms to the contours of the retaining member on the side facing the retaining member.

5 Claims, 3 Drawing Figures

WINDOW PANE FOR MOTOR VEHICLES

The invention relates to a window pane for motor vehicles, especially passenger cars, which is fixed in a window frame and which is arranged flush with the adjoining body panel of the vehicle. The window pane is retained in the window frame by means of a retaining member of appropriate sectional shape which is fastened to the window pane by cementing, vulcanizing or the spray-on technique. The window frame has a flange which extends parallel to the window pane and to which the retaining member is fitted. The retaining member is fitted into a recess of the window frame on the side of the fl In a prior art arrangement of this type disclosed in DE-OS No. 31 48 255, a retaining lip of an elongate profile member, which is embracing the flange inwardly, is fitted inside a U-shaped recess of the window frame and is retained therein by the projecting portion of an elongate locking member which is in the form of a molding, and the elongate locking member is also retained in position by this clamping action. However, the elongate locking member does not cooperate with the elongate retaining member in any other way.

In this prior art arrangement, the elongate retaining member is in the form of a weather strip to which the window pane is cemented. A second weather strip is provided for sealing the door relative to the body.

It is the object of the invention to provide the retaining member, which is joined to the window pane, with a better fit in all directions on the window frame, and to add strength and rigidity thereto. More particularly, the invention contemplates to provide these advantages in conjunction with economically manufactured retaining members of the spray-on type which may be made of, for instance, PVC material, so that in addition to providing the profiled retaining member with a better fit in all directions on the window frame, the arrangement will enable better sealing between the window frame and the vehicle body.

In accordance with the invention, this object is being achieved in a window pane of the type described above in that the retaining member is provided with a recess for a second projecting member of the locking member, and that the shape of the locking member on the side facing the profiled retaining member is, at least in the region of the projecting portions, complementary in contour to the shape of the retaining member.

This arrangement not only enables the retaining member to be reinforced, but it also permits the locking member, by virtue of the tight fit between it and the retaining member, to be made of a different material, such as rubber or rubber-like material, so as to render the locking member suitable to also serve as a sealing strip. The arrangement is one in which the retaining member and the profiled sealing strip are rigidly combined so as to form one member of appropriate sectional shape, with the projecting portions on the sealing member being in snap-fit engagement with corresponding recesses on the retaining member. This arrangement affords simplicity of installation and is very cost-effective.

The invention will now be described by way of the accompanying drawings, wherein.

Figure 1:
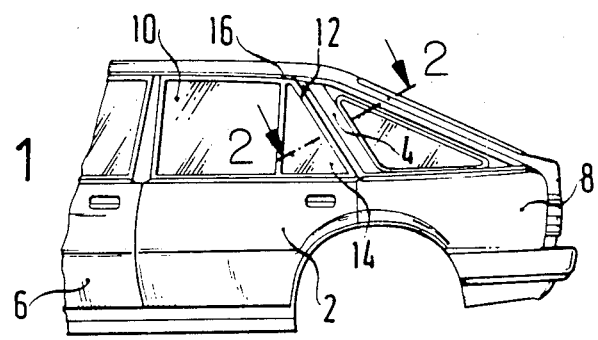
FIG. 1 is the rearward portion of a vehicle body.
Figure 2:
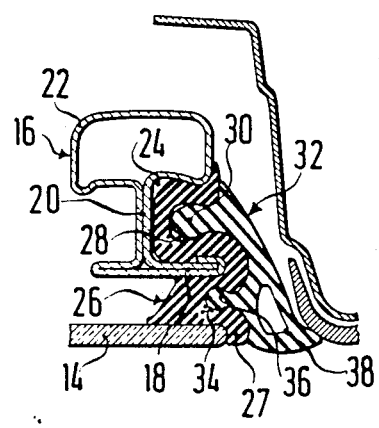
FIG. 2 is a sectional view along line 2—2 in FIG. 1.

Referring to FIG. 1, reference numeral 2 designates the rear door, and numeral 4 the roof pillar. The front door is denoted by the numeral 6, and the trunk by the numeral 8. The door 2 includes a drop window, i.e., a window which is vertically adjustable, as well as a fixed window 12 in which the window pane is fixedly secured to the window frame 16. FIG. 2 illustrates a cross section of the window frame taken through the rearward portion disposed adjacent to the roof pillar 4 and looking in the direction of the arrows 2—2 of FIG. 1.

The cross-sectional shape of the window frame 16 corresponds substantially to that illustrated in FIG. 2, including a flange 18, an adjoining web 20 and a tubular portion 22. In the area defined by the flange 18 and the portion 22, the window frame 16 forms U-shaped recesses 24, of which only the one disposed on the left-hand side is identified in the drawing. The profiled retaining member 26 is secured at one end to the window by cementing or other suitable means in such a manner that it will be joined with the inner side of the window pane 14 along or adjacent the edge thereof as well as on the end face thereof. To this end, the retaining member 26 has a portion 27 joined on the end face of the window pane 14, which joining permits tolerances in the surface area of the window pane 14 to be absorbed. The portion 27 of the retaining member 26, which surrounds the edge of the window pane 14, is arranged flush with the pane 14.

The retaining member 26 is fitted together with the window pane 14 to flange 18 of the window frame 16. The retaining member 26 at its other end portion is U-shaped and extends into the recess 24 of the window frame or frame means 16. The U-shaped end portion of the retaining member 26 defines or forms a recess 28 with an undercut, i.e., the recess 28 has lateral walls or side surfaces arranged so as to slightly diverge towards the bottom to enable a strip-like headed projection 30 of a locking member 32 to be snap fitted in the recess 28. As shown in FIG. 2, the headed projection 30 is shaped generally complementary with the recess 28 and when snap fittingly connected to the retaining member 26 serves to clamp the retaining member 26 disposed within the recess 24 of the frame 16 against the tubular portion 20 and flange 18 thereof to lock the retaining member in place. The recess 28 and the projecting portion 30 are disposed on the side of the flange 18 facing away from the window pane 14, i.e., inside the recess 24 of the window frame 16.

The retaining member 26 has a second recess 34 with an undercut, i.e., its lateral walls diverge toward its bottom, which is similar to the recess 28 and which is arranged between the window pane 14 and flange 18. A second headed projecting portion 36 of the locking member 32 is shaped substantially complementary with the recess 34 and is adapted for snap-fit engagement with the retaining member surfaces defining the recess 34. The locking member 32 is made of an elastomeric material, and its shape on the side of the retaining member 26 conforms to said retaining member 26. Thus, the locking member 32, by virtue of its projecting portions 30 and 36, reinforces the retaining member 26, which may be made of, for instance, PVC material. The locking member 32, even though forming one elongate profiled member with the profiled retaining member 26, is provided with a bead or tubular portion 38 and thus serves as a permanently elastic sealing strip, a function that could not be assumed by the retaining member 26 alone. Thus, the locking member 32 acts as a sealing means, and its mounting and support is improved by the recoil force of the material.

Figure 3:
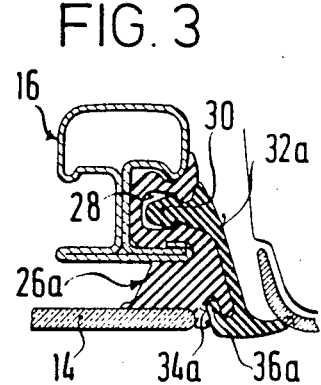
FIG. 3 is an arrangement that is somewhat different than the one in FIG. 2.

In the embodiment illustrated in FIG. 2, the recesses 28 and 34 on the retaining member 26, and thus the projecting portions 30 and 36 on the locking member 32, are extending parallel to one another. A further exemplary embodiment is illustrated in FIG. 3, wherein like reference numerals are used for denoting parts that are corresponding with those illustrated in FIG. 2. The retaining member 26a is of the same general configuration as in FIG. 2 and is mounted in the same fashion to the window frame 16. But unlike the embodiment illustrated in FIG. 2, the second recess 34a does not extend parallel to the recess 28, but instead extends substantially perpendicularly thereto. Accordingly, the second projecting portion 36a of the locking member 32a extends also perpendicularly to the first projection portion 30. In this embodiment, too, the objectives of providing a low-cost arrangement in combination with simple installation procedures are being achieved by virtue of the profiles 26a and 32a.

The embodiments of the invention in which an exclusive property or privilege is claimed are defined as follows:

1. In an automotive vehicle comprising vehicle body structure including exterior panel means, a window pane and a window frame means located interiorly of said window pane, and inwardly from its side edges, said window frame means having a flange extending parallel with the window pane and which defines with other portions of said frame means a recess facing in the same direction as the adjacent side edge of the window pane, a profiled retaining member for supporting said window pane on said frame means so that the window pane is substantially flush with the adjacent panel means of said vehicle, said retaining member having one end which is fixedly joined to said window pane on its interior side and which extends over said flange and has its other end received within said recess of said frame means, the improvement being that said profiled retaining member has a first recess at its other end defined by a bottom and a pair of side surfaces which diverge from each other toward said bottom and has a second recess with diverging side surfaces between said window pane and said flange on said frame, and that said retaining member is clamped in place on said frame by a profiled elastomeric locking member having first and second spaced projections shaped complementary with said first and second recesses of said retaining member and which are snap fittingly received within said first and second recesses, and wherein said elastomeric locking member has a flexible end portion which extends between said side edge of the window pane and said panel means to provide a seal therebetween.

2. In an automotive vehicle as defined in claim 1 and wherein said first and second recesses in said retaining member and said first and second projections on said locking member respectively extend substantially parallel to each other and to the window pane.

3. In an automotive vehicle as defined in claim 1 and wherein said first and second recesses in the retaining member and said first and second projections on the locking member respectively extend substantially perpendicular to each other.

4. In an automotive vehicle as defined in claim 1 and wherein said retaining member has an end portion extending around an end face of said window pane and wherein said latter end portion and said flexible end portion of the locking member are substantially flush with each other and with the window pane and said exterior panel on said vehicle.

5. In an automotive vehicle as defined in claim 1 and wherein said frame means and window pane are on a door of the automotive vehicle and wherein said flexible end portion of the locking member is substantially flush with said window pane and said exterior panel and serves as a seal between the window pane and frame on the door and said exterior panel of said vehicle.

* * * * *

UNITED STATES PATENT AND TRADEMARK OFFICE
CERTIFICATE OF CORRECTION

PATENT NO. : 4,625,459

DATED : December 2, 1986

INVENTOR(S) : Hermann Warner

It is certified that error appears in the above-identified patent and that said Letters Patent is hereby corrected as shown below:

Column 1, line 15, delete "fl" and insert -- flange facing away from the window by the clamping action of the projecting portion of an elongate locking member. --.

Signed and Sealed this

Twenty-first Day of April, 1987

Attest:

DONALD J. QUIGG

Attesting Officer

Commissioner of Patents and Trademarks